Jan. 26, 1971  D. G. JONES  3,557,416
CUTTING INSERT

Filed Aug. 16, 1968  2 Sheets-Sheet 1

INVENTOR.
DENNIS G. JONES

BY

Jan. 26, 1971  D. G. JONES  3,557,416
CUTTING INSERT

Filed Aug. 16, 1968  2 Sheets-Sheet 2

INVENTOR.
DENNIS G. JONES
BY
Melvin G. ...

United States Patent Office 3,557,416
Patented Jan. 26, 1971

3,557,416
CUTTING INSERT
Dennis G. Jones, Greensburg, Pa., assignor to
Kennametal Inc., Latrobe, Pa.
Filed Aug. 16, 1968, Ser. No. 753,168
Int. Cl. B26d 1/00
U.S. Cl. 29—95
11 Claims

ABSTRACT OF THE DISCLOSURE

The invention concerns throw away cutting inserts having positive value and especially useful for profiling operations. The inserts are molded and have an included angle at the points of from about 25° up to about 55°.

RELATED APPLICATION

Jones et al. 577,901, filed Sept. 8, 1966, now Pat. No. 3,399,442 of Sept. 3, 1968.

The present invention relates to cutting inserts, particularly to throw-away cutting inserts such as are adapted for being detachably mounted on a tool holder and placed in a machine tool for turning operations. More particularly still, the present invention is concerned with a throw-away cutting insert of the type referred to which is especially adapted for contour turning or profiling.

The turning of metals is, of course, well known and many types of inserts are provided for this purpose. In a pending U.S. application, Ser. No. 577,901, filed in the name of Dennis G. Jones and George E. Greubel on Sept. 8, 1966, and assigned to the same assignee as the present application, there is shown a positive rake type of insert, namely, one in which the included angle between the faces forming the cutting edge is less than 90 degrees so that the angle between the surface being cut and the one face of the insert over which the chips flow is greater than 90°.

Cutting inserts of the type referred to are generally made of a cemented metal carbide and are formed by pressing techniques after which the pressed articles are sintered. Following the sintering of such an article further shaping thereof is quite difficult and expensive and can only be done by employing diamond abrading elements.

For the foregoing reasons, inserts of the nature referred to generally are of the negative rake type so that they can be made economically by molding in a die cavity. In a negative rake tool, the two surfaces defining the cutting edge of the tool at their juncture are usually at right angles to each other; and when the tool is presented to a workpiece to be cut thereby and is tilted upwardly to provide clearance between the workpiece and the side of the insert facing the workpiece, the angle between the other face of the insert adjacent the cutting edge, and over which the chips flow, will make an angle of somewhat less than 90° with the workpiece surface. This provides for negative rake machining conditions which, while often satisfactory, are not always to be preferred because of the nature of the workpiece material, finish desired, and the amount of power required to turn the workpiece against the tool.

Positive rake tools hold in which the angle between the upper surface of the insert and the workpiece is greater than 90° are known but have generally been made by form grinding the inserts or by compensating the tool holder angles. In the co-pending application referred to above, there is disclosed a molded throw-away insert which the two faces forming the cutting edge of the insert at their juncture make an angle of less than 90° with each other so that the cutting edge can be presented to a workpiece with the insert tilted to provide side clearance while the angle between the face of the insert over which the chips flow and the surface of the workpiece being cut is greater than 90° thus providing for positive rake cutting conditions.

An insert having positive rake is of merit in that less power is required to drive the workpiece against the tool, a finer finish can be obtained, and many materials which would tend to tear, or which do not flow readily over the face of a negative rake insert, can be cleanly cut with the sharp edge of a positive rake insert. Further, there is less tendency for the insert to wear or crater at the cutting edge or to build up deposits thereon because the action of the positive rake insert is more in the nature of a true cutting action than the somewhat scraping or tearing action of a negative rake insert. Also, since the inserts are molded, they are economical to produce.

A particular work operation in which positive rake cutting inserts have special merit is that of profiling or contouring. Such work operations are ordinarily carried out under the control of the template with a follower and servo-motor mechanism disposed between the template and the tool slide carrying the holder on which the cutting insert is mounted, or by automatic control of the machine as by a punched tape or a magnetic tape or the like. The cutting inserts employed are usually parallelogram shaped when received in plan with two opposite acute angle corners and the other two opposite corners obtuse. The acute angle corners are the tips employed for cutting.

A characteristic of contouring and profiling operations is that rather complex workpiece configurations are formed, with the tool being guided in different directions during the profiling operation. Thus, the workpiece being formed may be partly cylindrical, partly conical, partly radial, and partly curved with the curved region being either convex or concave toward the outside of the workpiece, or both. The cutting insert, in traversing the workpiece, might thus be cutting in a straight line axially of the workpiece and might thereafter move in a straight line radially of the workpiece, and then move at an angle, and thereafter might follow a curved path in tracing the workpiece. Each of these different regions imposes different conditions on the cutting insert not only with respect to the forces exerted on the insert but also with respect to the depth of cut which the insert is taking and the direction in which chips flow across the edge of the insert and the thickness of the chips taken. Further, the particular region of the cutting edge of the insert that is actively employed in the cutting operation will change.

It is desired for the contour of a workpiece to be as nearly completely formed in one operation as possible and, to permit the insert to form shoulders facing in one direction, and at least the major portion of curved surfaces of the workpiece, the insert is arranged so that its most nearly radial side is inclined from a radius of the workpiece while the adjacent side of the insert is inclined away from a line parallel to the axis of the workpiece. The insert thus points in such a manner that at least right angle shoulders facing in one direction on the workpiece can be turned and substantially more than half of even semi-circular curves can be formed. With particular respect to the forming of curves, the smaller the angle between adjacent lateral faces of the insert, the more of a curved surface that can be formed with the insert and the steeper the angle of the conical portions that can be formed with the insert.

Inserts of the nature referred to are thus often made in the form of parallelograms with the angles between the lateral sides at the pointed apices of the parallelogram being as small as 25° and increasing in steps of about 2½ to 5 degrees up to around 55 degrees.

The present invention proposes to provide inserts, particularly molded inserts, and especially for profiling operations, characterized in presenting a positive rake to the workpiece and so constructed as to meet adequately all of the varying conditions met by the inserts during profiling operations and including adequately sustaining any work loads imposed on the insert.

The particular object of the present invention is the provision of an improved profiling insert for the turning of work members.

Another object of the present invention is the provision of a profiling insert which presents a positive rake to the workpiece being machined.

Still another object of the present invention is the provision of a cutting insert for profiling operations in which the insert will perform cutting operations properly with proper chip flow and chip configuration on any type of contour being turned and either direction of movement of the insert over the workpiece.

The foregoing objects as well as still other objects and advantages of the present invention will become more apparent upon reference to the following detailed specification taken in connection with the accompanying drawings in which.

Figure 2:
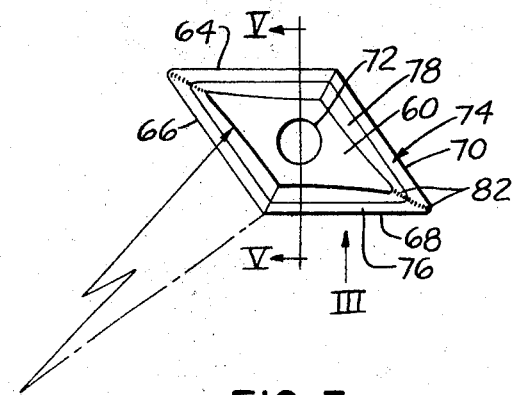
FIG. 2 is a plan view showing an insert according to the present invention having a tip angle of 55 degrees.
Figure 3:
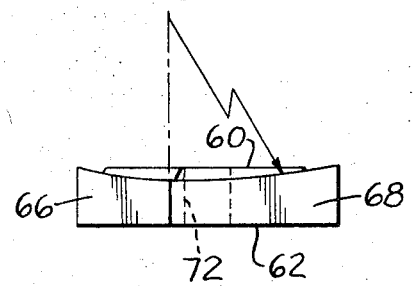
FIG. 3 is a side view of the insert of FIG. 2 looking in direction of the arrow III toward FIG. 2.
Figure 4:
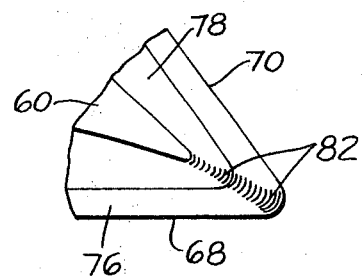
Figure 5:
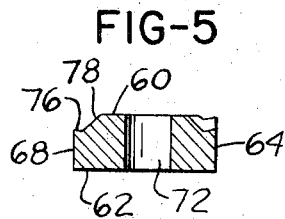
Figure 6:
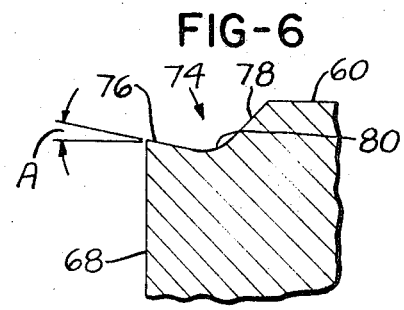
Figure 7:
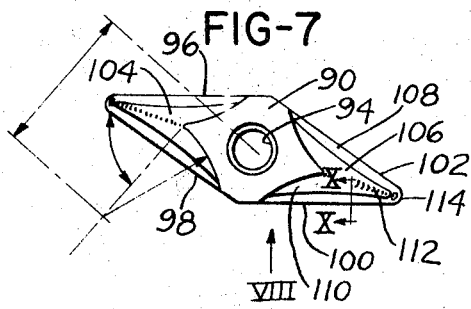
Figure 8:
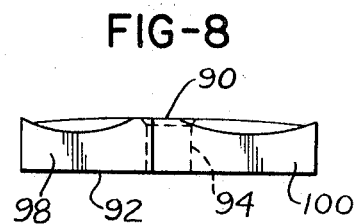
Figure 9:
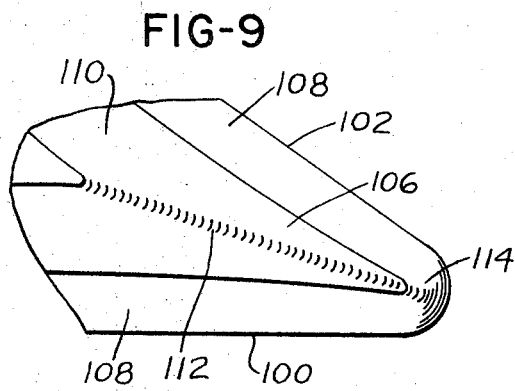
Figure 10:
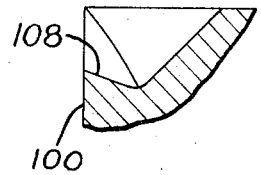
Figure 11:
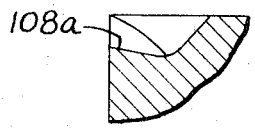

FIG. 4 s a view showing the cutting tip of the insert of FIGS. 2 and 3 drawn at enlarged scale;

FIG. 5 is a cross section to the insert of FIGS. 2 and 3 and is indicated by line V—V on FIG. 2;

FIG. 6 is a fragmentary view showing more in detail the formation of an edge of the insert of FIGS. 2 and 3 by means of which positive rake in the amount of angle "A" is provided for the insert;

FIG. 7 is a plan view of an insert according to the present invention having a tip angle of 35 degrees;

FIG. 8 is a side view of the insert of FIG. 7 looking toward FIG. 7 in the direction of arrow VIII;

FIG. 9 is a fragmentary view of the insert of FIG. 7 drawn at enlarged scale showing more in detail the formation of one of the cutting tips of the insert of FIGS. 7 and 8;

FIG. 10 is a fragmentary sectional view indicated by line X—X on FIG. 7 and showing the manner in which the cutting edge of the tool is caused to have a positive rake; and FIG. 11 is a view like FIG. 10 showing an insert with a smaller rake angle.

Figure 1:
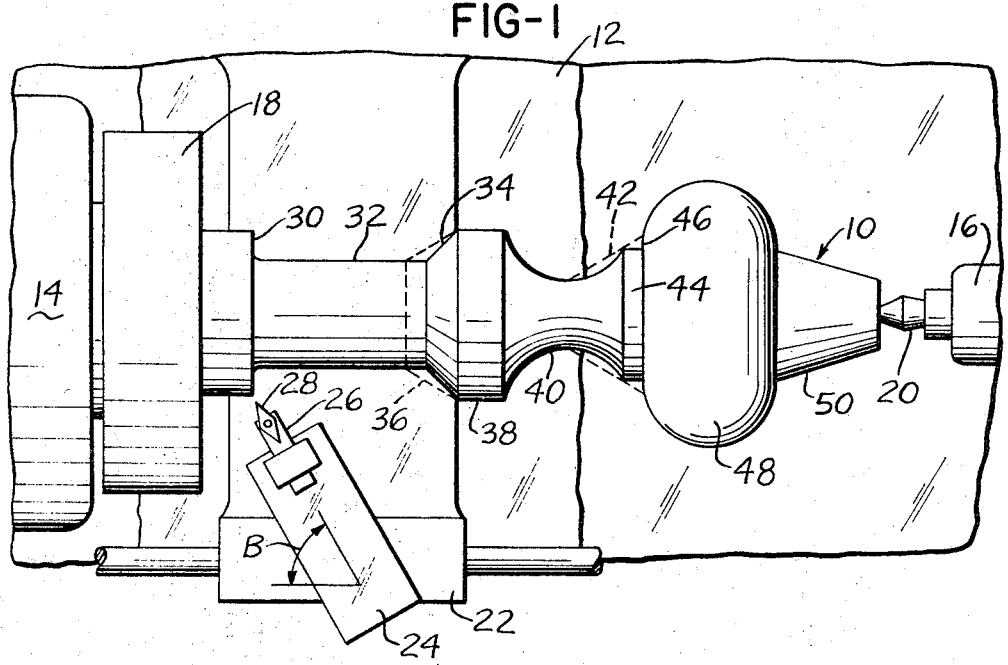
FIG. 1 shows a workpiece which has been profiled with a cutting insert according to the present invention and illustrating the manner in which the cutting insert is supported for movement relative to the workpiece.

Referring to the drawings somewhat more in detail, FIG. 1 schematically shows a workpiece 10 of complex configuration which it is desired to contour in a turning machine such as a lathe. The shape of the workpiece is purely imaginative and is designed to show various conditions met during contouring. The lathe has a bed 12 with a head stock 14 at one end and a tail stock 16 at the other end. Head stock 14 rotatably supports a chucking device 18 which drivingly engages and supports one end of workpiece 10 while the other end thereof is supportingly engaged by tail stock center 20. The lathe comprises a carriage 22 guided for movement parallel to the work axis of the lathe and which work axis coincides with the axis of rotation of workpiece 10.

Tool slide 24 is mounted on carriage 22 and is reciprocable thereon at a pre-selected angle indicated at "B" in FIG. 1. The movement of the carriage 22 longitudinally of the lathe and the movement of tool slide 24 traversely of the lathe is under the control of any suitable known mechanisms such as template - follower - servo - motor mechanism or a punched tape or magnetic tape controlled computer mechanism and forms no part of the present invention.

Tool slide 24, at its end adjacent workpiece 10 carries a tool holder 26 which has an insert 28 according to the present invention mounted therein. The workpiece is traversed by the cutting insert from end to end and, assuming that the cutting operation is started at the left, the insert would first turn radial surface 30 on the workpiece and would then turn cylindrical surface 32. At the end of cylindrical region 32 is a conical tapered region 34 but the angle thereof is such that the point of the cutting insert cannot fully form this region and must, instead, travel along the inclined path indicated at 36. Following conical portion 34 is another cylindrical portion 38 and following that is a curved portion 40 which is cross section is concave in the direction away from the workpiece. Insert 28 can follow the left side of curved portion 40 but the final part of curved portion 40 cannot be cut by insert 28 and the insert must follow the inclined path 42. Inclined path 42 leads past a short cylindrical region 44 and the beginning portion 46 of a curved region 48 of the workpiece which is convex away from the workpiece.

Portions 44 and 46 cannot be cut with the insert 28 in the position in which the insert is illustrated. The remainder of the curved part 48 of the workpiece at the right end of the workpiece and the final conical end of the workpiece 50, however, can be cut with the insert. By adjusting angle "B," the uncut regions inside inclined lines 36 and 42 can also be shaped with the insert 28. In any case, it will be appreciated that the major portion of the surface of the workpiece can be turned with one and the same setting of insert 28 and, furthermore, that the insert can traverse the workpiece either from left to right or from right to left.

As will be seen hereinafter an insert according to the present invention could, for example, take a roughing cut in one direction and return in the opposite direction taking a finishing cut. As will also be seen the insert according to the present invention will cut equally well an either side of the cutting tip or at the cutting tip so that the workpiece finish and the turning load is not substantially changed as the contour of the workpiece changes.

Referring to FIGS. 2 through 6, there is shown in some detail an insert according to the present invention in which the angle between the lateral sides of the insert at the cutting tip is 55° at each end of the insert. The insert has a flat upper wall 60 and a bottom wall 62 which is parallel therewith and four flat lateral walls 64, 66, 68 and 70. The lateral walls are substantially perpendicular to the top and bottom walls so that the insert can readily be molded in and removed from a die cavity. A central hole 72 extends through the insert in about the middle and perpendicular to the top and bottom walls and may be employed for clamping the insert on a holder although the insert can be clamped on the holder merely by asserting pressure thereon, in which case hole 72 is not required.

The insert has a groove or recess, generally indicated at 74, extending completely therearound where the lateral walls of the insert meet the plane of the top wall thereof. The groove consists of an outer surface portion 76 which is in the form of a portion of a cylinder for each of the four edges of the insert. In the inserts shown in FIGS. 2 through 6, the cylinder pertaining to each edge is inclined on about a 10° angle to the plane of the top wall of the insert so that the insert will have a positive rake relative to the workpiece surface when it is tilted so as to have side clearance.

The groove also comprises an inner surface portion 78, also a portion of a cylinder, which may be tilted backwardly from the vertical at an angle of about 55°. The corners of the insert where the walls 64 and 66 and the walls 68 and 70 meet are rounded with a radius of about .005 inch. A small fillet of about .03 inch is provided at 80 where the two portions of the groove join.

The aforementioned inner surface portion 78 of the groove 74 is also cylindrical so that the groove varies in depth and width along each side of the insert. As will be seen at FIG. 4, the curved inner and outer surface portion of the groove in the top of the insert is blended with a small radius of about 0.015 inch at 82 at each of the 55° points of the insert.

With the described arrangement, the insert is capable of presenting positive rake to the workpiece being contoured on all surfaces of the work that are accessible to the point of the insert which is presented to the work. By inclining the insert downwardly toward the workpiece to provide side clearance, it will be found that side clearance will be obtained in all operative positions of the inserts.

Due to the varying groove molded into the insert, both light and heavy cuts at a wide range of feed rates can be taken with the proper chip flow and chip configuration taking place across the top of the insert.

Referring to FIGS. 7 through 10, a similar molded insert is illustrated except that the sharp angle at the cutting tips of the insert is only about 35°. The insert of FIGS. 7 through 10 has parallel top and bottom walls 90 and 92 respectively and a central hole 94 and has lateral faces 96, 98, 100 and 102. The groove in the insert which provides for positive rake is, however, divided into two portions; 104 at one end of the insert and 106 at the other end of the insert. This leaves the central portion of the insert undiminished as to cross section and thereby of maximum strength.

Each groove portion is formed by an outer surface portion 108 extending along the adjacent lateral edge and in the form of a portion of a cylinder having its axis inclined to the plane of the top of the insert at an angle of, say, 45° to the top wall of the insert. The inner surface portions 110 of the recess at each cutting tip of the insert are blended at 112 with about a .005 radius and the portions 108 at each cutting tip of the insert are blended at 114 with a radius of about 0.015 inch.

The particular angle presented by the surface portions 108 in FIGS. 7 to 10 and surface portion 76 in FIGS. 1 to 6 is, of course, variable by varying the angle of incline of the axis about which the generatrix of the surface moves. This is demonstrated by a comparison of FIGS. 10 and 11. In FIG. 10 the axis of the axis of the cylinder of which the portion 108 is a part is inclined at 20° to the top face of the insert whereas, in FIG. 11, the corresponding surface 108a is a part of a cylinder which is inclined at 10° to the top face of the insert. It will be apparent that any particular angle of inclination can be obtained in this manner so as to obtain any desired degree of positive rake for the cutting edge of the insert when it is tilted to provide a required amount of side clearance from the workpiece.

In general, assuming about a 5° side clearance, an angle of inclination of the outer surface portion of the groove of 10° would give a 5° positive rake at the workpiece surface, while an inclination of 20° of the outer surface portion groove would give a 15° positive rake.

It will be evident that the formation of the insert is such that the back rake is ordinarily positive from the cutting edge and over a substantial portion of the insert. It is possible, however, to form the insert in such a manner that while a positive rake angle is presented to the workpiece for cutting purposes, the back rake might be negative.

It will be appreciated that modifications and adaptations could be made in the present invention falling within the scope of the appended claims.

What I claim is:

1. A cutting insert, especially for profiling operations, comprising a body of hard wear resistant material, said body having flat parallel top and bottom walls and flat side walls perpendicular to said top and bottom walls, said body when viewed perpendicular to said top wall being in the form of a parallelogram having acute angles on the order of from 20 degrees to 60 degrees at a pair of first opposite corners and obtuse angles complementary to said acute angles at the pair of second opposite corners, and groove means in at least the top wall of said body extending inwardly from the periphery thereof and comprising a groove leading from the acute angle first corners of said insert along each of the sides of the body which meet at said first corners, each said groove having a first outer surface extending inwardly and downwardly into the top of the insert from the pertaining side wall and a second inner surface extending upwardly from the inner edge of said outer surface and inwardly away from the pertaining side wall, the included angle between each said first surface and the pertaining side wall being less than 90 degrees, each of said inner and outer surfaces being curved in cross section and concave toward the top wall of the body of the insert.

2. A cutting insert for profiling according to claim 1 in which each of said inner and outer surfaces is a portion of a cylinder having its axis inclined to the plane of the top wall of the body of the insert.

3. A cutting insert for profiling according to claim 2 in which the axis of each said cylinder is disposed in a plane which is perpendicular to the plane of the respective side wall of the body of the insert and which intersects the said plane of the side wall in the region thereof which extends from the said first corner to the said second corner of the body of the insert pertaining to the respective side wall.

4. A cutting insert, for profiling, according to claim 3 in which the said acute first angles are from about 22½° to 55° with the said plane perpendicular to the plane of the respective side wall and intersecting the plane of the side wall nearer the apex of the respective acute angle first corner of the body of the insert than the pertaining obtuse second corner thereof.

5. A cutting insert, for profiling, according to claim 4 in which the grooves leading away from said acute angle first corners diminish in depth and width as they approach said obtuse angle second corners and terminate before they reach said obtuse angle second corners so that a central region of the body of the insert extending thereacross in the direction from one second corner thereof to the other is undiminished in cross section.

6. A cutting insert, for profiling, according to claim 3 in which the said acute first angles are from about 22½° to 55° and the said plane perpendicular to the plane of the respective side wall intersects the plane of the side wall at the apex of the respective obtuse angle second corner.

7. A cutting insert, for profiling, according to claim 3 in which said acute first angles are from about 22½° to 55° and the said plane perpendicular to the respective side wall intersects the plane of the side wall in about the middle of the length of the said side wall.

8. A cutting insert according to claim 3 in which said included angle between each said outer surface of the groove and the pertaining adjacent side wall is from about 70 to 80 degrees so the insert can be mounted in a holder and presented to a workpiece with side clearance and, due to said included angle, will have a positive rake angle.

9. A cutting insert, for profiling, according to claim 1 in which said hard wear resistant material includes at least one of the hard metal carbides.

10. A cutting insert, for profiling, according to claim 1 in which the juncture of each outer surface with its respective inner surface is blended with a small fillet.

11. A cutting insert, for profiling, according to claim 1 in which the juncture of the said inner surfaces of the grooves meeting at the acute angles of the body of the insert are blended with a small fillet.

References Cited

UNITED STATES PATENTS

| | | | |
|---|---|---|---|
| 3,084,416 | 4/1963 | Broughton | 29—96 |
| 3,137,917 | 6/1964 | Dowd | 29—96 |
| 3,187,406 | 6/1965 | Franko | 29—95 |
| 3,381,349 | 5/1968 | Newcomer | 29—95 |
| 3,383,748 | 5/1968 | Galimberti et al. | 29—95 |
| 3,395,434 | 8/1968 | Wirfelt | 29—95 |
| 3,399,442 | 9/1968 | Jones et al. | 29—95 |
| 3,407,467 | 10/1968 | Wirfelt | 29—95 |

FOREIGN PATENTS 3,150,005    10/1963    Germany.

HARRISON L. HINSON, Primary Examiner